US009468032B2

(12) United States Patent
Novak et al.

(10) Patent No.: US 9,468,032 B2
(45) Date of Patent: *Oct. 11, 2016

(54) INTER-DEVICE SESSION CONNECTIVITY ENHANCEMENT

(71) Applicant: BlackBerry Limited, Waterloo (CA)

(72) Inventors: Robert Novak, Stittsville (CA); David Gwyn Steer, Nepean (CA); Dongsheng Yu, Nepean (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/992,346

(22) Filed: Jan. 11, 2016

(65) Prior Publication Data
US 2016/0128122 A1    May 5, 2016

Related U.S. Application Data (63) Continuation of application No. 13/583,499, filed as application No. PCT/IB2011/050828 on Feb. 25, 2011, now Pat. No. 9,237,590.

(51) Int. Cl.
*H04B 7/00* (2006.01)
*H04W 76/02* (2009.01)
(Continued)

(52) U.S. Cl.
CPC ...... *H04W 76/023* (2013.01); *G06F 17/30345* (2013.01); *G06F 17/30589* (2013.01);
(Continued)

(58) Field of Classification Search
USPC ............... 455/41.2, 41.3, 418, 420, 500
See application file for complete search history.

(56) References Cited

U.S. PATENT DOCUMENTS

| 5,666,661 A | 9/1997 | Grube et al. |
| 7,027,820 B2 | 4/2006 | Spratt |

(Continued)

FOREIGN PATENT DOCUMENTS

| CN | 201173970 Y | 12/2008 |
| CN | 101387882 A | 3/2009 |

(Continued)

OTHER PUBLICATIONS

Cohen, Alan; "RF Fingerprinting Pinpoints Location"; Network World; http://www.networkworld.com/news/tech/2004/101104techupdate.html; Oct. 11, 2004; 2 pages.

(Continued)

*Primary Examiner* — Dominic Rego
(74) *Attorney, Agent, or Firm* — Conley Rose, P.C.; J. Robert Brown, Jr.

(57) ABSTRACT

Devices and methods are provided for managing device-to-device (D2D) communications session in a wireless-enabled communication environment. A first client node comprises a database containing location and ID information associated with a plurality of second client nodes. The location information in the database is updated as individual second client nodes change their location. As the location information is updated, it is processed by the first client node to determine the distance between it and an individual second client node. If the distance between the first client node and the individual second client node is within a viable D2D communications range, then the user of the first client node is notified that a D2D communications session can be initiated with the individual second client node.

21 Claims, 6 Drawing Sheets

(51) Int. Cl.

| | | |
|---|---|---|
| *H04W 8/08* | (2009.01) | |
| *G06F 17/30* | (2006.01) | |
| *H04L 5/00* | (2006.01) | |
| *H04W 4/00* | (2009.01) | |
| *H04W 8/00* | (2009.01) | |
| *H04W 84/18* | (2009.01) | |

(52) U.S. Cl.
CPC ............ *H04L5/0055* (2013.01); *H04W 4/008* (2013.01); *H04W 8/005* (2013.01); *H04W 8/08* (2013.01); *H04W 84/18* (2013.01)

(56) References Cited

U.S. PATENT DOCUMENTS

| | | |
|---|---|---|
| 7,164,930 B2 | 1/2007 | Korneluk et al. |
| 7,444,137 B1 | 10/2008 | McNamara et al. |
| 8,010,131 B2 | 8/2011 | Rothschild |
| 8,358,609 B1 | 1/2013 | Cona et al. |
| 8,521,194 B2 | 8/2013 | Laroia et al. |
| 8,554,200 B2 | 10/2013 | Ribeiro et al. |
| 8,588,803 B2 | 11/2013 | Hakola et al. |
| 8,639,819 B2 | 1/2014 | Pohja et al. |
| 8,666,403 B2 | 3/2014 | Yu et al. |
| 9,084,235 B2 | 7/2015 | Steer et al. |
| 9,237,590 B2 | 1/2016 | Novak et al. |
| 2002/0029258 A1 | 3/2002 | Mousseau et al. |
| 2004/0203472 A1 | 10/2004 | Chien |
| 2005/0073443 A1 | 4/2005 | Sheha et al. |
| 2006/0148502 A1 | 7/2006 | Korneluk et al. |
| 2006/0240855 A1 | 10/2006 | Kalhan |
| 2007/0153747 A1 | 7/2007 | Pan et al. |
| 2008/0139114 A1 | 6/2008 | Ranganathan |
| 2008/0298280 A1 | 12/2008 | Joshi et al. |
| 2008/0310376 A1 | 12/2008 | Ban et al. |
| 2008/0318592 A1 | 12/2008 | Mandalia |
| 2010/0085947 A1 | 4/2010 | Ringland et al. |
| 2010/0261469 A1 | 10/2010 | Ribeiro et al. |
| 2011/0051642 A1 | 3/2011 | Krishnaswamy |
| 2011/0163914 A1 | 7/2011 | Seymour |
| 2015/0296555 A1 | 10/2015 | Steer et al. |

FOREIGN PATENT DOCUMENTS

| | | |
|---|---|---|
| CN | 101617346 A | 12/2009 |
| EP | 1385345 A1 | 1/2004 |
| GB | 2390510 A | 1/2004 |
| WO | 0115387 A1 | 3/2001 |
| WO | 2008107697 A1 | 9/2008 |
| WO | 2009027354 A2 | 3/2009 |
| WO | 2010038139 A1 | 4/2010 |
| WO | 2012114160 A1 | 8/2012 |

OTHER PUBLICATIONS

Lin, Hsiuping, et al.; "Enhanced Indoor Locationing in a Congested Wi-Fi Environment"; Carnegie Mellon University; Silicon Valley; MRC-TR-2009-04; Mar. 2009; 16 pages.

Pandya, Dhruv, et al.; "Indoor Location Estimation Using Multiple Wireless Technologies"; The 14th IEEE 2003 International Symposium on Personal, Indoor and Mobile Radio Communication Proceedings; 2003; 5 pages.

Tran, Kha, et al.; "Indoor Location Prediction Using Multiple Wireless Received Signal Strengths"; Proceedings of the 7th Australasian Data Mining Conference; Australian Computer Society; 2008; 6 pages.

Office Action dated Dec. 31, 2014; U.S Appl. No. 13/583,499, filed Sep. 7, 2012; 15 pages.

Final Office Action dated May 28, 2015; U.S. Appl. No. 13/583,499, filed Sep. 7, 2012; 20 pages.

Notice of Allowance dated Aug. 26, 2015; U.S. Appl. No. 13/583,499, filed Sep. 7, 2012; 15 pages.

Office Action dated Jul. 31, 2014; U.S. Appl. No. 13/643,241, filed Oct. 29, 2013; 11 pages.

Notice of Allowance dated Nov. 21, 2014; U.S. Appl. No. 13/643,241, filed Oct. 29, 2013; 7 pages.

Notice of Allowance dated Mar. 3, 2015; U.S. Appl. No. 13/643,241, filed Oct. 29, 2013; 9 pages.

PCT International Search Report; Application No. PCT/IB2011/050828; Aug. 22, 2011; 3 pages.

PCT Written Opinion of the International Searching Authority; Application No. PCT/IB2011/050828; Aug. 22, 2011; 5 pages.

Canadian Office Action; Application No. 2,828,074; Feb. 26, 2015; 4 pages.

PCT International Search Report; Application No. PCT/IB2011/050829; Sep. 1, 2011; 3 pages.

PCT Written Opinion of the International Searching Authority; Application No. PCT/IB2011/050829; Sep. 1, 2011; 6 pages.

Canadian Office Action; Application No. 2,827,866; Nov. 13, 2014; 3 pages.

Canadian Office Action; Application No. 2,828,074; Feb. 1, 2016; 3 pages.

Chinese Office Action as Received in Co-pending Application No. 201180068407.2 on Jan. 18, 2016; 7 pages. (No English translation available).

Chinese Office Action as Received in Co-pending Application No. 201180070412.7 on Feb. 4, 2016; 6 pages. (No English translation available).

European Extended Search Report; Application No. 11859635.2; Aug. 19, 2016; 7 pages.

INTER-DEVICE SESSION CONNECTIVITY ENHANCEMENT

CROSS-REFERENCE TO RELATED APPLICATIONS

This application is a continuation of U.S. patent application Ser. No. 13/583,499 filed Sep. 7, 2012 entitled, "Inter-Device Session Connectivity Enhancement", which is a National Stage Filing of International Application No. PCT/IB2011/050828 filed Feb. 25, 2011 entitled, "Inter-Device Session Connectivity Enhancement", all of which are incorporated by reference herein as if reproduced in their entirety.

BACKGROUND

The widespread adoption of cellular technologies in recent years has created a corresponding burden on existing cellular networks. As a result, alternative approaches to routing communication sessions are being considered to reduce network congestion. Such approaches include device-to-device (D2D) sessions, where the session traffic is not routed through the network, but instead, directly between the devices themselves. Known approaches to D2D sessions include the implementation of a session-set-up filter (SSUF) as a cellular network entity to assist in the initiation of D2D sessions.

In one approach, the SSUF not only directly assigns and supervises the use of inter-device communication channels among devices, but also identifies which devices are located within inter-device channel communication range of each other. In this approach, the SSUF typically administers the inter-device communication channels to manage interference, device location information, and handover requests between D2D and conventional wireless communication technologies. In another approach, the SSUF enables the broadcast of inter-device communication channel availability information within a cell to D2D-enabled devices, which then use the broadcast information to initiate a D2D session on their own. In this approach, the SSUF assists neighboring devices in locating other devices that are within inter-device channel range. For example, a device wishing to use inter-device channels for communication would send its identification and the identification of any desired devices to the SSUF. In response, the SSUF would then broadcast a page message to request the desired devices to listen to the inter-device channel for communications from its neighbor.

However, one obstacle to the realizing the benefits of D2D sessions is the fact that a device is typically not aware of the location of other devices that are capable of using an inter-device channel for communication. Furthermore, D2D session set-ups performed by a network entity (e.g. SSUF) may result in delays that are noticeable to the user of the devices. Moreover, some D2D sessions may not be successful due to signal interference or shadowing of the radio signals, despite the fact that appear to be possible due to device proximity.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

The present disclosure is directed in general to communications systems and methods for operating same. In one aspect, the present disclosure relates to devices and methods for managing device-to-device communication sessions in a wireless-enabled communication environment.

Devices and methods are provided for managing device-to-device (D2D) communication sessions in a wireless-enabled communication environment. In various embodiments, a first client node comprises a database containing location and ID information associated with a plurality of second client nodes. In these and other embodiments, the location information in the database is updated as individual second client nodes change their location. As the location information is updated, it is processed by the first client node to determine the distance between it and each of the second client nodes. If the distance between the first client node and an individual second client node is within a viable D2D communications range, then the user of the first client node is notified that a D2D communications session can be initiated with the individual second client node.

In these various embodiments, D2D communications include configurations of client nodes requiring cooperation of transmissions among client nodes that are proximate to one another within a similar area. Accordingly, such configurations may comprise client nodes operating in Multiple Input Multiple Output (MIMO) configurations, Cooperative Multipoint (CoMP) configurations, Interference Control (IC), direct device-to-device communications, and relaying of information among client nodes.

In various embodiments, the updates to the location data are received by the first client node in a location update message provided by an individual second client node. In one embodiment, the first client node provides its associated location and ID data to the second client node in a location data response message. In another embodiment, the first client node requests additional location data from the individual second client node in an additional location data request message. n yet another embodiment, the frequency of the timing of the receipt of the location data update message is dependent upon the distance between the first client node and the individual second client node.

In one embodiment, the first client node generates and subsequently sends a D2D session test message to a second client node. If the second client node successfully receives the D2D session test message, it generates and subsequently sends a D2D session test acknowledgement message to the first client. If the D2D session test message is successfully received by the first client node, then a D2D session with the second client node is initiated by the first client node.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, a combination of hardware and software, software, software in execution. For example, a component may be, but is not limited to being, a process running on a processor, a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points.

Examples of Internet or Intranet nodes include host computers identified by an Internet Protocol (IP) address, bridges and WLAN access points. Likewise, examples of nodes in cellular communication include base stations, base station controllers, home location registers, Gateway GPRS Support Nodes (GGSN), and Serving GPRS Support Nodes (SGSN).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Figure 1:
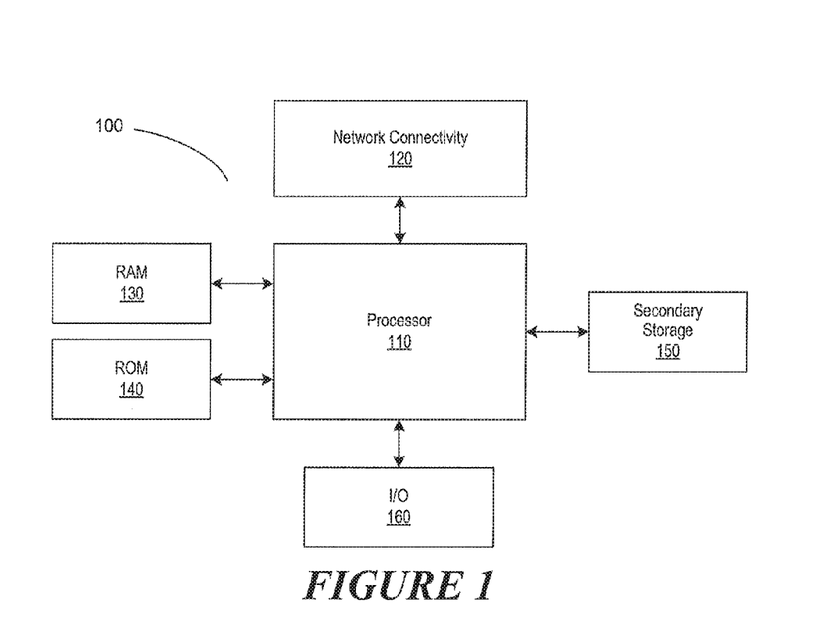
FIG. 1 depicts an exemplary system in which the present invention may be implemented.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity devices 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity devices 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity devices 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks, including Personal Area Networks (PANs) such as Bluetooth. These network connectivity devices 120 may enable the processor 110 to communicate with the Internet or one or more telecommunications networks or other networks from which the processor 110 might receive information or to which the processor 110 might output information.

The network connectivity devices 120 may also be capable of transmitting or receiving data wirelessly in the form of electromagnetic waves, such as radio frequency signals or microwave frequency signals. Information transmitted or received by the network connectivity devices 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may be used to store instructions and perhaps data that are read during execution of the instructions. Access to both RAM 130 and ROM 140 is typically faster than to secondary storage 150. The secondary storage 150 is typically comprised of one or more disk drives or tape drives and may be used for non-volatile storage of data or as an over-flow data storage device if RAM 130 is not large enough to hold all working data. Secondary storage 150 may be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
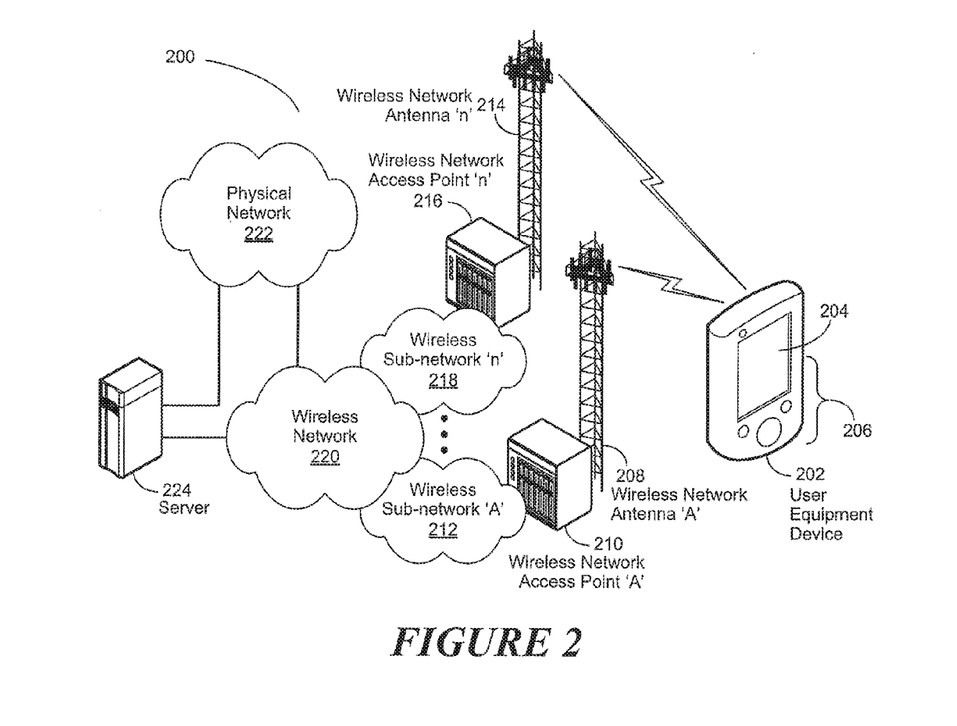
FIG. 2 shows a wireless-enabled communications environment including an embodiment of a client node.

FIG. 2 shows a wireless-enabled communications environment including an embodiment of a client node as implemented in an embodiment of the disclosure. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. The various applications may likewise be obtained from a peer client node 202 or other system over a connection to the wireless network 220 or any other wireless communication network or system. In various embodiments, the wireless network 220 comprises a plurality of wireless sub-networks (e.g., cells with corresponding coverage areas) 'A' 212 through 'n' 218. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. In turn, the wireless network access points 'A' 210 through 'n' 216 are respectively coupled to wireless sub-networks 'A' 212 through 'n' 218, which are connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204. Alternately, the client node 202 may access the wireless network 220 through a peer client node 202 acting as an intermediary, in a relay type or hop type of connection. Alternately, the client node 202 is tethered and obtains its data from a tethered device that is connected to the wireless network 212. Skilled practitioners of the art will recognize that many such embodiments are possible and the foregoing is not intended to limit the spirit, scope, or intention of the disclosure.

Figure 3:
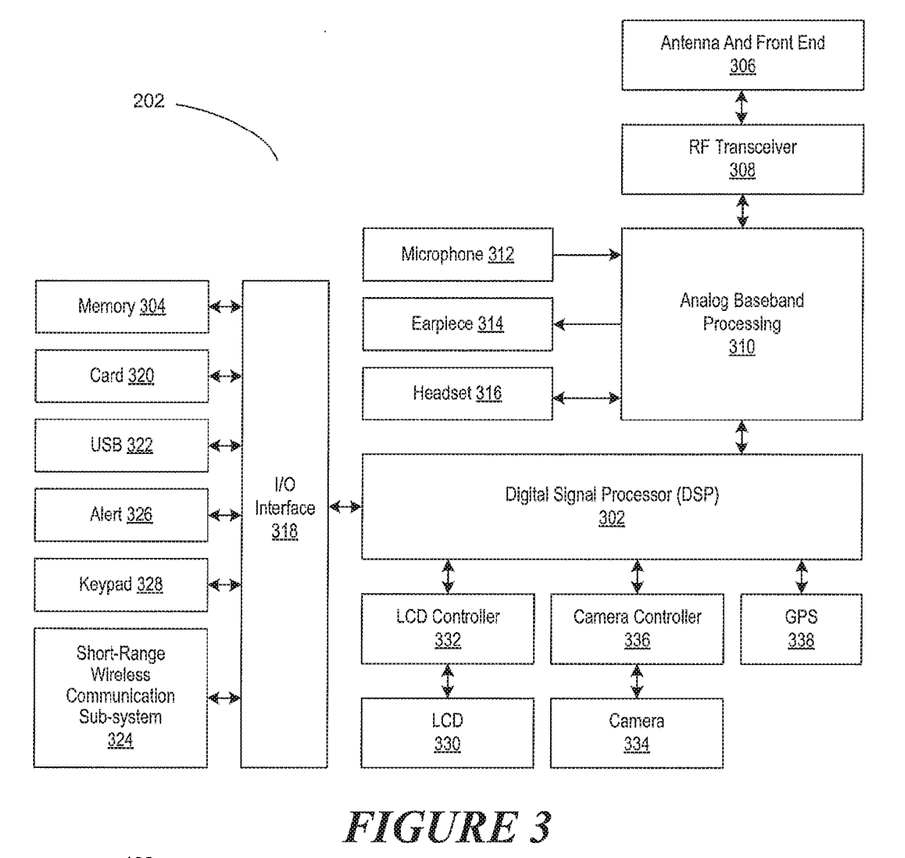
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the disclosure. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals, thereby enabling the client node 202 to determine its position. Various other peripherals may also be included to provide additional functions, such as radio and television reception.

Figure 4:
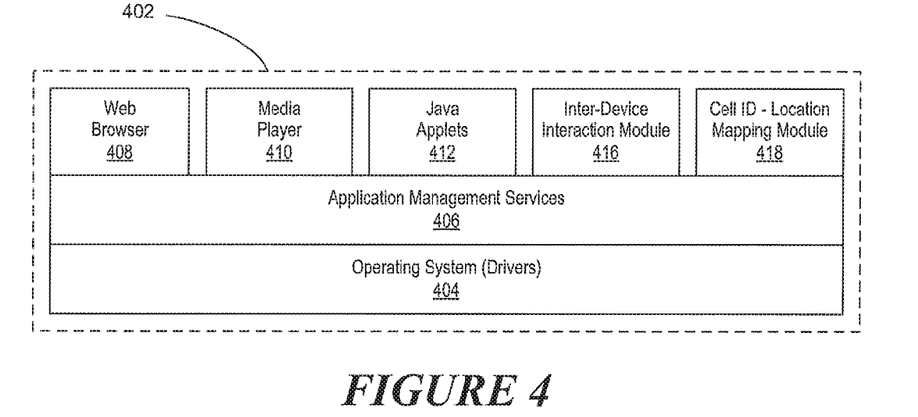
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, Java applets 412, an inter-device interaction module 416, and a cell ID-location mapping module 418. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. The inter-device interaction module 416 is used to send and receive messages to and from device-to-device (D2) enabled client nodes 202, and is likewise used to perform data processing operations, described in greater detail herein, related to maintaining D2D-related data and cooperative operating configurations. The cell ID location mapping module 418 is used to compare the physical locations of cell IDs that belong to different networks. Accordingly, it enables two devices, subtending to different networks and having different cell ID number bases, to determine if their locations are similar. As an example, two cell IDs may have overlapping coverage areas.

In various embodiments, the short-range wireless communications subsystem 324 may include antennas representative of possible multiple radio link capabilities. This may, in practice, involve several radios each with multiple antennas. The client node 202 (e.g. a radio device) used for device-to-device communications, as well as the radios used for mobile and fixed wireless network communications, is included within this element. Likewise, the client node 202 and associated antennas may be shared among a number of different radio modes of operation. A wired interface may likewise be included in the short-range wireless communications subsystem 324 as it may be applicable to devices that have wired, or fiber, connections to a network (e.g. access nodes). This wired interface may not be present on the client node 202, and for fixed devices such as access nodes there may be multiple wired connections or connections to other network equipment. In various embodiments, the client node 202, the wireless network nodes 'A' 210 through 'n' 216, and the server node 224 shown in FIG. 2 may likewise include a processing component that is capable of executing instructions related to the actions described above.

Figure 5:
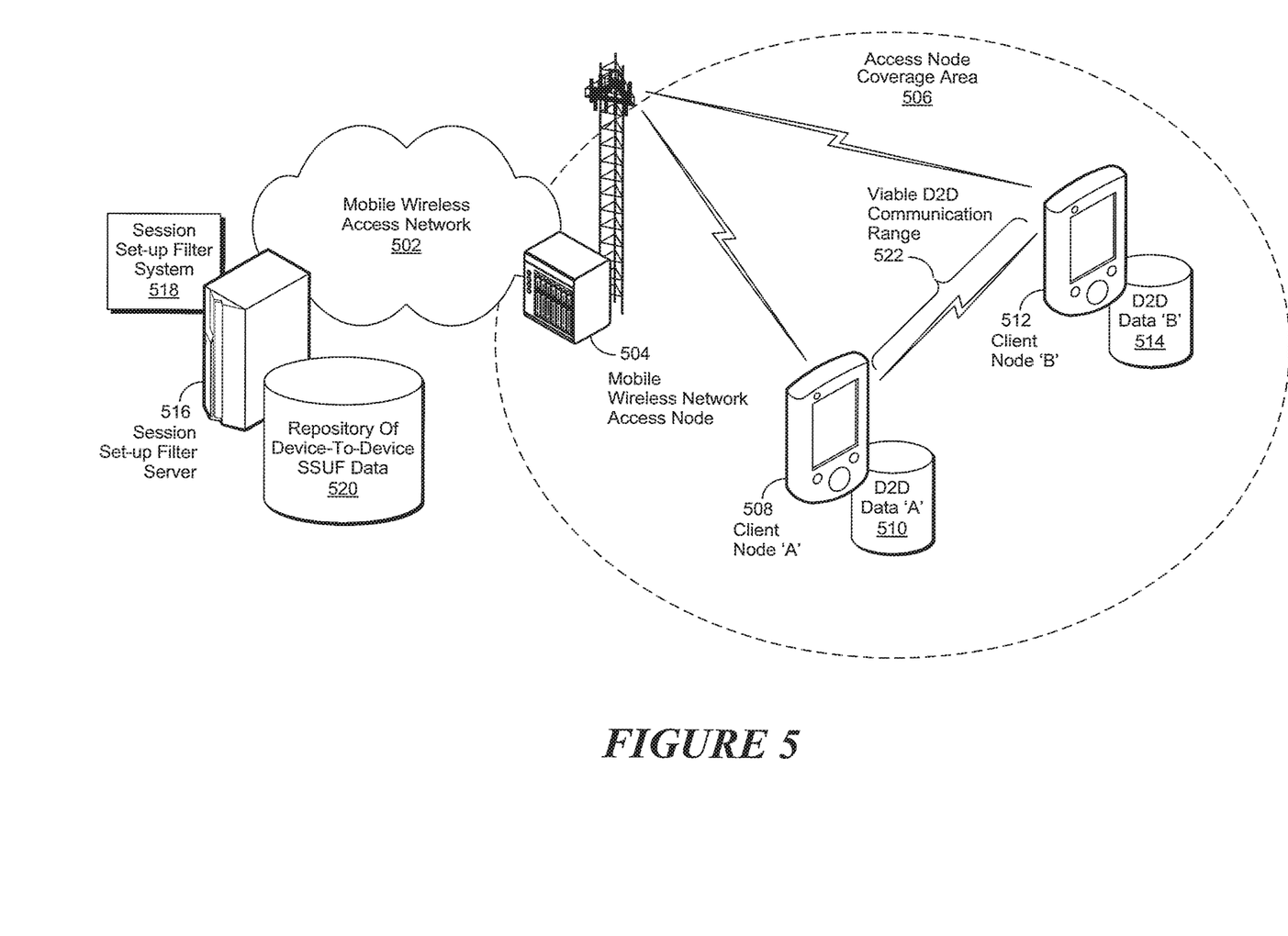
FIG. 5 is a simplified block diagram for performing device-to-device (D2D) session operations.

FIG. 5 is a simplified block diagram for performing device-to-device (D2D) session operations as implemented in accordance with an embodiment of the disclosure. In this embodiment, a mobile wireless access network 502 comprises session set-up filter (SSUF) server 516 and a mobile wireless network access node 504. The SSUF server 516 further comprises a SSUF system 518 and a repository of D2D and SSUF data as described in greater detail herein. The mobile wireless network access node 504 comprises a corresponding access node coverage area 506 for providing mobile wireless communication capabilities for client nodes 'A' 508 and 'B' 512.

In this and other embodiments, the client nodes 'A' 508 and 'B' 512 are enabled to initiate and subsequently conduct D2D communication sessions and respectively comprise a repository of D2D data 'A' 510 and 'B' 514. In various embodiments, the repositories of D2D data 'A' 510 and 'B' 514 comprise a contact list store where client nodes 'A' 508 and 'B' 512 respectively maintains a list of other client nodes (e.g., other mobile devices) that are likewise D2D-enabled. The repositories of D2D data 'A' 510 and 'B' 514 may, for example, be contained in the memory 304 or the removable memory card 320 of the client node 202. In these and other embodiments, the repositories of D2D data 'A' 510 and 'B' 514 are automatically updated with client node location proximity information maintained in the repository of D2D and SSUF data 520 by the SSUF system 518. In these various embodiments, individual listings within these lists may include the status of the other client nodes including their current location and whether a D2D link has been tested and is possible at the client nodes' A' 508 and 'B' 512 current locations.

In this and other embodiments, a client node 'A' 508 is determined to be available to use an inter-device channel for D2D communication with client node 'B' 512 if the client nodes 'A' 508 and 'B' 512 are within a viable D2D communication range 522. As an example, if client node 'B' 512 is capable of D2D communications if it is within 400 meters (e.g., the viable D2D communication range 522) from client node 'A' 508, then it will appear as available to client node 'A' 508 for D2D communications. Skilled practitioners of the art will appreciate that while distances of hundreds of meters may be typical for D2D communication, the actual feasible distance is dependent on local propagation conditions, device specifications, and other variables. Accordingly, the viable D2D communication range 522 can be set to a predetermined communication range that is dependent upon the aforementioned factors and on observed performance.

To facilitate the determination of the viable D2D communication range 522, the client node 'A' 508 monitors its current location as it operates. This may be, for example, through monitoring of the cell-ID associated with the mobile wireless network access node 504 associated with the access node coverage area 506, through which it subtends the mobile wireless access network 502. However other location mechanism such as Global Positioning System (GPS), can be used to determine its approximate location within the access node coverage area 506. In one embodiment, the location of client node 'B' 512 is requested from a network entity, such as the SSUF system 518, in response to client node 'A' 508 requesting updated information on available devices (e.g., client node 'B' 512).

In various embodiments, a location data update message is sent from client node 'A' 508 to other client node members (e.g., client node 'B' 512) stored in its repository of D2D data 'A' 510 to indicate its current location. In this embodiment, the messages provide the identity of the sender (e.g., client node 'A' 508), and associated location information, to those receivers (e.g., client node 'B' 512) that receive the message. Upon successfully receiving the message, the receiver will be aware of the sender's presence and its capability for D2B communication. In one embodiment, the client node 'B' 512 provides the client node 'A' 508 a location data response message comprising its associated location and identification data in response to receiving the location data update message. In another embodiment, the client node 'A' 508 provides the client node 'B' 512 a location data update response message comprising updated location data and identification data associated with the client node 'A' 508 in response to receiving the location data update message. In yet another embodiment, the client node 'A' 508 provides the client node 'B' 512 an additional location data update message requesting additional location data associated with the client node 'B' 512 in response to receiving the location data update message.

In certain of these various embodiments, the messages are sent at intervals, but not frequently enough to significantly load the implemented radio access technology. For example, a message may be sent to possible contacts (e.g., client node 'B' 512) every 5 minutes if a message has not been received from those contacts in that time. In certain other of these various embodiments, the messages are sent more frequently to members of the contact list that are nearby, such as those currently associated within the same cell-ID or a similar location area, and less frequently to members who are in the most distant locations, such as those located within a geographically distant cell-ID.

In various embodiments, the content of the messages sent from client node 'A' 508 to members of its contact list is dependent on the assumed distance of each contact. In one embodiment, the granularity of the location of the client node 'A' 508 may be more coarse when sending updates to more distant client nodes, and finer when updating client nodes that are nearer. For example, client nodes that are known to be across the world may only receive an update on the country location of the client node 'A' 508, whereas a client node assumed to be with a few kilometers are sent more specific information such as cell-ID, or precise GPS locations of a high level of accuracy.

In one embodiment, the client node 'A' 508 is made aware of other client nodes (e.g., client node 'B' 512) that are within the viable D2D communication range by sending a message to possible contacts (e.g., the client node 'B' 512) with an inquiry related to possible D2D communications. In another embodiment, the client node 'A' 508 sends a message over a radio channel, such as a mobile network communications channel, to other client nodes (e.g., the client node 'B' 512) requesting the client node's location. In this and other embodiments, the location information may be indicated by absolute location, including location error range, from GPS or other source, or another reference point such as a cell tower ID or a similar location area reference. In various embodiments, the receiving client node (e.g., client node 'B' 512) responds with their location to the initiating client node (e.g., the client node 'A' 508), and the initiating client node determines whether they are available for D2D communications. In one embodiment, the initiating client node includes its location information in the initial message to other client nodes. The response from the other client nodes may not need to contain location information, but instead, an indication if D2D communication is possible. These embodiments may be used to limit the distribution of location information to other client nodes. Likewise, the contact list may be updated without requiring the detailed location information of each other device.

In various embodiments, a client node (e.g., the client node 'B' 512) receiving a location message from an initiating client node (e.g., the client node 'A' 508) may do one or more of sending a response with their location, request additional location information, or update their repository of D2D data (e.g., repository of D2D data 'B' 514). In these and other embodiments, the location information from the initiating client node may indicate that the two client nodes are beyond the viable D2D communication range 522 significantly larger than the distance suitable for D2D communications. If so, then the receiving client node updates its repository of D2D data with the information associated with the initiating client node. In various embodiments, the client node receiving a location update message from a member of its contact list may determine that the initiating client node is close enough to update the location information associated with the initiating node in its repository of D2D data. Alternatively, the receiving client node may send its position to the initiating client node or request more detailed location information from the initiating client node, if applicable.

In various other embodiments, client nodes send messages to members of the contact list stored in their repository of D2D data in response to a significant perceived change in their location. In one embodiment, a client node (e.g., the client node 'A' 508) may determine it has changed countries or geographical regions based on identification information associated with the mobile wireless access node 504 or from associated operator information.

In another embodiment, the client node (e.g., the client node 'A' 508) may detect it has moved a significant distance from the location previously reported to members of the contact list stored in its repository of D2D data (e.g., the repository of D2D data 'A' 510). In these various embodiments, the client node 'A' 508 determines that it has moved a significant distance and provides a location update to members of its contact list. In various of these embodiments, the determination of a significant distance to require sending location information can be achieved by determining that the information last provided to a member of the contact list is no longer valid. Likewise, the client node may determine that it has moved into proximity on the order of, or less than, the granularity of the location information provided by another client node in its contact list.

In various embodiments, the client nodes 'A' 508 and 'B' 512 may likewise provide multi-level information of their availability for D2D communications as part of the availability information provided to members of their respective contact lists. In one embodiment the availability of client nodes 'A' 508 and 'B' 512' for D2D communication is indicated on the basis of distance to a client node. For example, a network entity (e.g., the SSUF system 518) determining the availability of inter-device communications between two client nodes (e.g., client nodes 'A' 508 and 'B' 512) provides a multilevel indication related to the distance separating the client nodes. For example, if 400 meters is the maximum separation (i.e., the viable D2D communication range) for reliable D2D communications, a separation of 200 to 300 meters may be indicated as 'excellent.' Likewise, a separation of 300-400 meters may be indicated as 'average,' a separation of 400-500 meters is indicated as 'poor', and a separation of greater than 500 meters is indicated as 'unavailable'. Those of skill in the art will recognize that these example distances will depend on the frequency and radiated power of radio communications operations used by the client nodes.

In one embodiment, an autonomous test message is sent across the inter-device channel to test its performance between two client nodes appearing on each other's respective contact lists. In one embodiment, the test message provides identification and location data associated with an initiating client node to a receiving client node. In response, the identification and location data associated with the receiving client node is provided in a response message to the initiating client node. If the test message is successful (e.g., a successful response if received by the initiating client node), then the users' of the initiating and receiving client node are informed of the current availability of the member of the contact list.

In various embodiments, some D2D communication traffic destined for recipient client nodes is stored internally within the initiating client node until a suitable inter-device channel is available. Once a suitable inter-device channel is available, the traffic is automatically communicated by the initiating client node to the recipient client node. In certain of these various embodiments, the transmission of the stored communication traffic is initiated by the user upon being informed that the inter-device channel is available. In various embodiments, the quality of the inter-device channel is determined from the aforementioned test message exchange. In certain of these various embodiments, multi-level information regarding the quality of the link is indicated based on the signal communications quality of the two-way messaging, rather than solely upon distance measurements.

In one embodiment, a new D2D session may be initiated by an initiating client node without requiring further testing of the inter-device channel for suitability of D2D communications. In various embodiments, the initiating client node checks its contact list for verification of the recipient client node's availability for D2D communication. In these and other embodiments, the contact list may provide existing estimates of the recipient client node's location, proximity and estimated link quality based on the initial, or previous, link test. In this manner the link may not require further testing before beginning a new D2D session.

From the foregoing, skilled practitioners of the art will recognize that implementation of the disclosure in its various embodiments minimizes the inter-device signaling used to maintain the proximity information at each client node. Likewise, the disclosure provides for automatic testing and session set-up and the transfer from, or to, network-based communications links when the D2D communication channel links become available or are no longer suitable. The disclosure likewise provides the advantage of not requiring network-based resources to monitor status and manage D2D communication links, thereby obviating the need for a network server. Furthermore, the use of such D2D communication links improves radio resource utilization by moving local traffic away from wide area spectrum and radio network resources. Furthermore, the knowledge of the availability of the D2D links can facilitate the operation of cooperative node communications including client nodes operating in Multiple Input Multiple Output (MIMO) configurations, Cooperative Multipoint (CoMP) configurations, Interference Control (IC), and relaying of information among client nodes.

Figure 6:
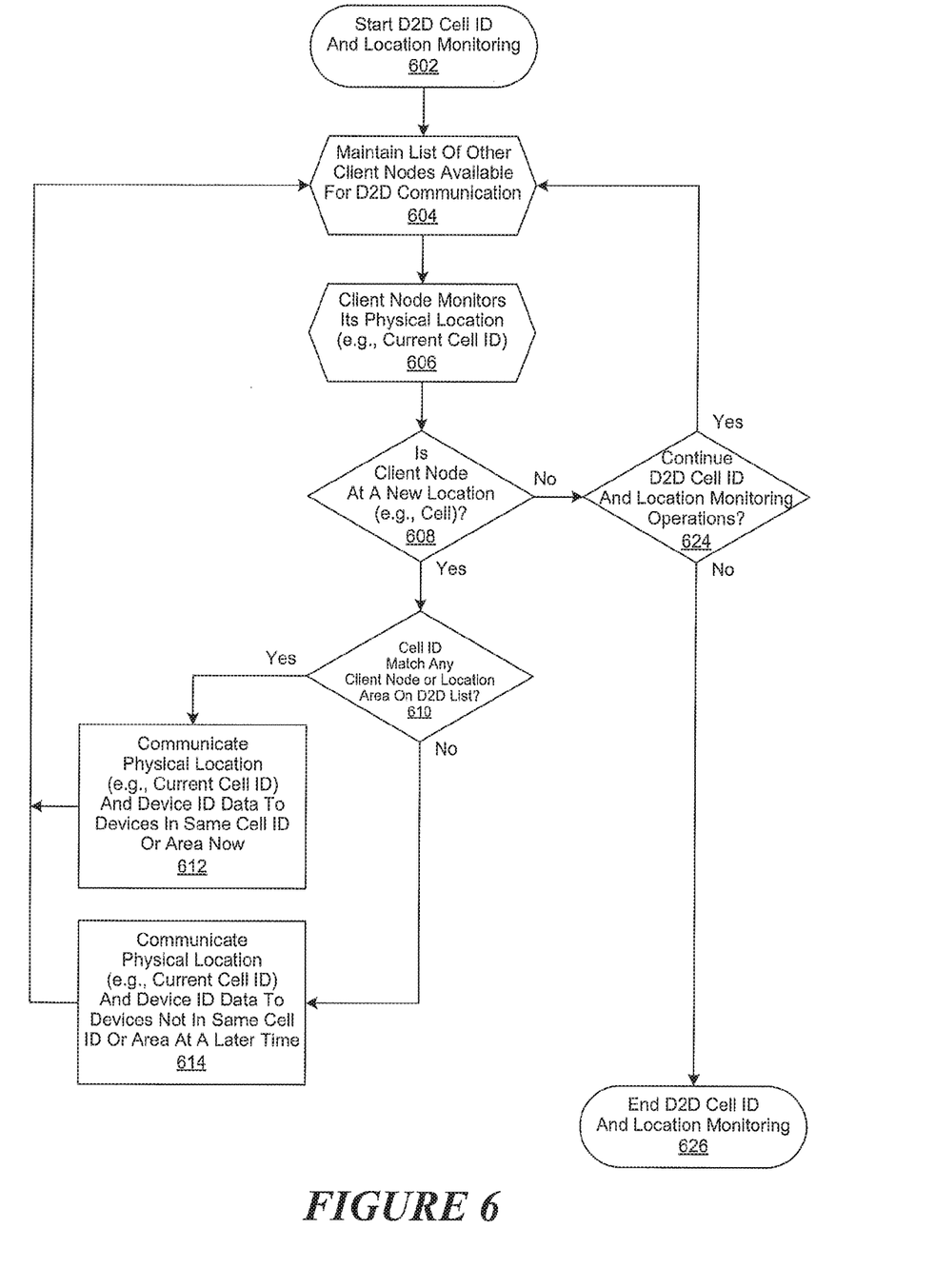
FIG. 6 is a generalized flowchart for monitoring D2D cell IDs and locations.

FIG. 6 is a generalized flowchart for monitoring device-to-device (D2D) cell identifiers (IDs) and locations as implemented in accordance with an embodiment of the disclosure. In this embodiment, D2D cell ID and location monitoring operations are begun in step 602, followed by a client node (e.g., a mobile device) performing list maintenance operations in step 604 to maintain a contact list of other client nodes available for D2D communications. In various embodiments, the contact list of client nodes may include client nodes that have been previously selected by the user, client nodes that have been automatically included as a result of prior D2D communications previously, or some combination thereof.

In step 606, the client node monitors its current physical location. In various embodiments, the client node monitors the cell ID of the cell tower associated with the cellular base station through which it subtends a mobile wireless access network. In another embodiment, the client node's physical location is determined through the implementation of a Global Positioning System (GPS). In these and other embodiments, various area location selectors are used to filter client nodes that are local (e.g., within a viable D2D communication range), those for which D2D communications may become possible (e.g., poor radio conditions), and those for which the distance is large and communications is likely impossible for the operable radio frequency band. In some embodiments, the client node may comprise multiple forms of communications equipment that are suitable for communications over various communication ranges. Those of skill in the art will recognize that such location-based filtering provides an effective means to minimize the signaling necessary to maintain the currency of the aforementioned client node contact list.

In this and other embodiments, the client node may be mobile. If so then a determination is made in step 608 whether the client node has moved to a different location. As an example, the client node may perform location-based filtering to determine changes in cell IDs or GPS location data to determine whether it has settled in a new cell, or instead, is simply transiting through it.

If it is determined in step 608 that the client node is not in a new location, then a determination is made in step 624 whether to continue D2D cell ID and location monitoring operations. If so, then the process is continued, proceeding with step 604. Otherwise, D2D cell ID and location monitoring operations are ended in step 626. However, if it is determined in step 608 that the client node is in a new location, then it checks its repository of D2D data in step 610 to determine whether its new cell ID or location area corresponds to any of the other client nodes in client node contact list.

If so, then in step 612, the client node sends detailed data related to its current location, such as its GPS coordinates, to client nodes that are currently within the same cell or locations within viable communications range. Thereafter, the process is continued, proceeding with step 604. In various embodiments, the detailed location information may be sent using any suitable messaging service (e.g. such as IP, PPP, PIN communication or SMS). In various other embodiments, the client node processes cell ID mapping data to determine whether the other client nodes are in similar areas, such as when the other client nodes are in a different network. In yet other various embodiments, the client node sends its new cell-ID information, but not its detailed location coordinates, to other client nodes on the client node contact list that are not known to have the same cell ID or be in a similar area.

In these various embodiments, the client node automatically sends updated location information to other client nodes in their client node contact list whenever there is significant change in their location. Likewise, the client node will send other related information whenever there is a significant change in radio communication conditions (e.g. signal blockage due to shadowing) or status information (e.g. power on/off, user available/unavailable). In certain of these various embodiments, updates in location information, or other related conditions, are sent at predetermined intervals. For example, the update message may be sent within 10 minutes of the most recent communication with another client node in the client node contact list.

However, if it is determined in step 610 that the client node's new cell ID or similar area does not correspond to any of the other client nodes in its client node contact list, then the client node communicates its location and related information in step 614 to the client nodes that are not located in the same cell ID or similar area at a later time. Thereafter, the process is continued, proceeding with step 604. In various embodiments, the client node performs filtering operations to determine the timing of sending the location update messages to reduce the volume of signaling traffic. For example, a client node may send location and cell ID information less frequently to client nodes in its client node contact list that are known to be very far away, and hence, unlikely to within a viable D2D communication range in the near term. To further the example, the update messages may only be sent at infrequent intervals, such as intervals of many hours, or when the client node has made a significant change in its location. Accordingly, client nodes that are known to be in closer proximity would automatically receive more frequent updates, while client nodes that are at a great distance would be updated infrequently.

Figure 7:
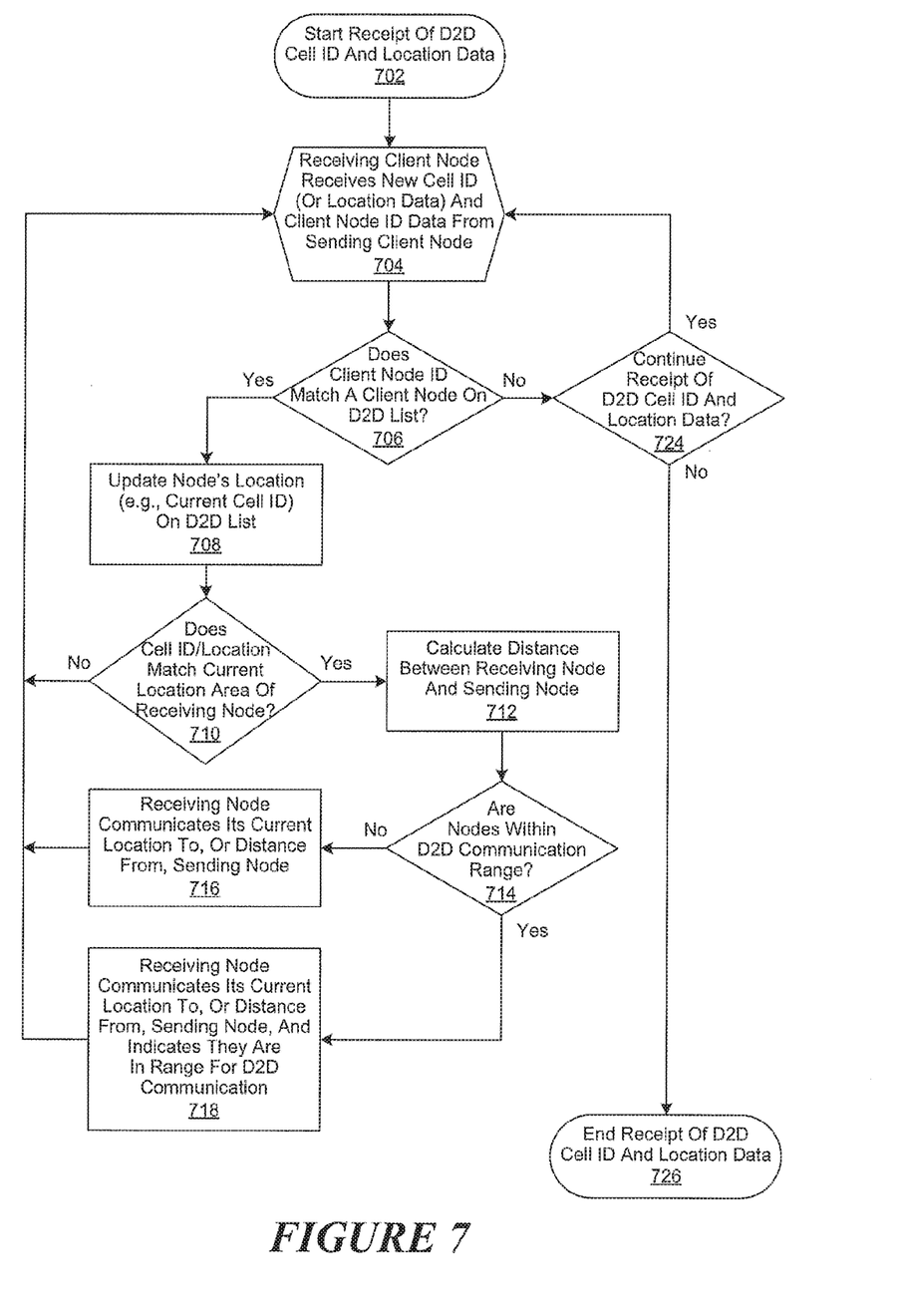
FIG. 7 is a generalized flowchart for receiving D2D cell ID and location data.

FIG. 7 is a generalized flowchart for receiving device-to-device (D2D) cell identifier (ID) and location data as implemented in accordance with an embodiment of the disclosure. In this embodiment, operations for the receipt of D2D Cell ID and location data are begun in step 702, followed by the receipt in step 704 of new cell ID (or associated location data) and client node ID data by a receiving client node from a sending client node. In various embodiments, the information may be transmitted from the sending client node to the receiving client node using any suitable messaging service, such as IP, PPP, PIN communication or SMS.

A determination is made by the receiving node in step 706 whether the sending client node ID is on its client node contact list. If not, then the message is ignored and a determination is made in step 724 whether to continue operations for the receipt of D2D Cell ID and location data. If so, the process is continued, proceeding with step 704. However, if it is determined in step 706 that the sending client node ID is on the receiving client node's contact list, then the sending client node's location information is updated in the receiving node's contact list in step 708.

A determination is then made in step 710 whether the cell ID or similar location area of the sending client node matches that of the receiving client node. If not, then the process is continued, proceeding with step 704. Otherwise, the receiving client node communicates its location information to the sending client node in step 712 to confirm that the two client nodes are in proximity and to likewise enable them to calculate if a D2D communications session is viable by calculating the distance between them. In various embodiments, the receiving client node is within the same cell as the sending client node. In these embodiments, receiving client node receives the sending client nodes' coordinates, in addition to its cell ID, and it calculates the distance between the client nodes by using its own location information.

A determination is then made in step 714 whether the two client nodes are within a viable D2D communications range. If not, then the receiving client node communicates its current location to, or distance from, the sending client node in step 716 and the process is continued, proceeding with step 604. Otherwise, the receiving node communicates its current location to, or distance from, the sending client node in step 716 and indicates that they are within a viable range for D2D communications. The process is then continued, proceeding with step 704.

In various embodiments, the receiving node proposes various communication parameters for the D2D communication session to the sending client node once it has determined that they are within a viable D2D communications range. In these and other embodiments, the viability of a D2D communications session is based on whether the distance between the two client nodes is less than a distance threshold. In one embodiment, the distance threshold is predetermined. In another embodiment, it is dynamically calculated based on results of prior D2D communications links at similar locations or distances.

Figure 8:
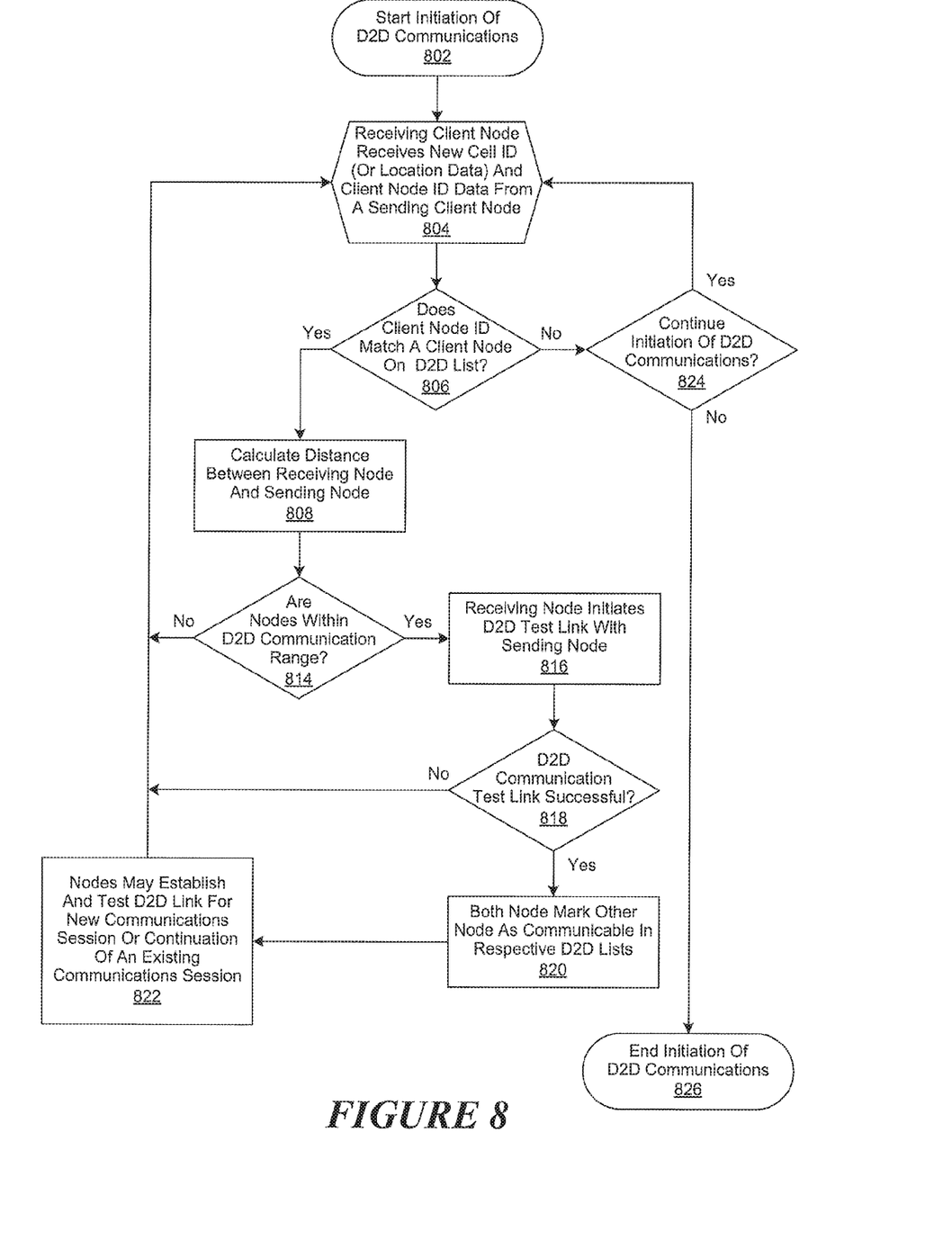
FIG. 8 is a generalized flowchart for initiating D2D communications.

FIG. 8 is a generalized flowchart for initiating device-to-device (D2D) communications as implemented in accordance with an embodiment of the disclosure. In this embodiment, operations for the initiation of D2D communications are begun in step 802, followed by the receipt in step 804 of new cell ID (or associated location data) and client node ID data by a receiving client node from a sending client node. In various embodiments, the information may be transmitted from the sending client node to the receiving client node using any suitable messaging service, such as IP, PPP, PIN communication or SMS.

A determination is made by the receiving node in step 806 whether the sending client node ID is on its client node contact list. If not, then the message is ignored and a determination is made in step 824 whether to continue operations for the initiation of D2D communications. If so, the process is continued, proceeding with step 804. However, if it is determined in step 806 that the sending client node ID is on the receiving client node's contact list, then the distance between the receiving client node and the sending client node is calculated in step 808.

A determination is then made in step 814 whether the two client nodes are within a viable D2D communication range, as described in greater detail herein. If not, then the process is continued, proceeding with step 802. Otherwise, the receiving client node initiates a D2D test link, such as a ping transmission, to the sending client node in step 816. A determination is then made in step 818 whether the D2D test link was successful. If not, then the process is continued, proceeding with step 804. Otherwise, both client nodes mark the other client node as being communicable in their respective client node contact list in step 820. Then, in step 822, either the receiving client node, or the sending client node, may establish a D2D communications with the other client node.

In one embodiment, either of the two client nodes may indicate to its respective user that a client node on its client node list is within range for D2D communications. In another embodiment, an application implemented on either of the client nodes guides the user in establishing a D2D communications session with the other client node. In yet another embodiment, a D2D communication session is automatically established between the two client nodes to communicate traffic that has been saved until a D2D communication session is established. In still another embodiment, a D2D session may be handed-over for continuation in a non-D2D communication session using other communications channels. Thereafter, the process is continued, proceeding with step 804.

Skilled practitioners of the art will recognize that while the various embodiments provided herein refer to D2D sessions between pairs of client nodes when each pair is in proximity, the disclosure is equally applicable for initiating multi-node links among groups of client nodes that are within a viable D2D communication range. In various embodiments, such multi-node links are established using multi-cast transmissions known to those of skill in the art. In these and other embodiments, the multi-cast transmissions are supported in radio access technologies through the implementation of a group address for a multi-cast group. Client nodes sending to the group use the group address to address their transmission and receivers of the group transmission decode messages based on the group address. In these various embodiments, the multi-node links may be a combination of paired links among client nodes as well as common multi-cast communications links among multiple client nodes.

Although the described exemplary embodiments disclosed herein are described with reference to managing device-to-device communication sessions in a wireless-enabled communication environment, the present disclosure is not necessarily limited to the example embodiments which illustrate inventive aspects of the present disclosure that are applicable to a wide variety of authentication algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A client node, comprising:
    a data store comprising identification data and location data associated with at least one second client node; and
    processing logic operable to process the identification data and the location data to identify an individual second client node of the at least one second client node within device-to-device (D2D) communication range;
    wherein the processing logic is further operable to initiate an update of the identification data and the location data of the at least one second client node to maintain currency of location data,
    wherein the client node receives a location data update message from the individual second client node, wherein the location data update message comprises updates to the location data associated with the individual second client node;
    wherein, the processing logic is further operable to initiate a first D2D communications session with the individual second client node that is within D2D communication range, and wherein the client node receives the location data update message from the individual second client node in response to a perceived location change of the individual second client node.

2. The client node of claim 1, wherein the client node receives the location data update message from the individual second client node, further comprising, in response to a predetermined time elapsing after the first D2D communications session is established between the client node and the individual second client node.

3. The client node of claim 1, wherein the client node receives the location data update message from the individual second client node, further comprising, in response to the distance between the client node and the individual second client node exceeding a predetermined threshold.

4. The client node of claim 1, wherein the client node receives the location data update message from the individual second client node after a predetermined interval after the client node establishes a communications session with the individual second client node.

5. The client node of claim 4, wherein the frequency of the predetermined interval of the receipt of location data update message is dependent upon the distance between the first and second client nodes.

6. The client node of claim 1, wherein the D2D communications session comprises one of the set of:
    data communications directly between client nodes;
    Multiple Input Multiple Output (MIMO) configurations;
    Cooperative Multipoint (CoMP) configurations;
    Interference Control (IC); and
    relaying of information among client nodes.

7. The client node of claim 1, wherein:
    the client node generates and subsequently sends a first D2D session test message to the individual second client node;
    the individual second client node successfully receives the first D2D session test message; and
    the individual second client node generates and subsequently sends a D2D session test acknowledgement message to the client node.

8. The client node of claim 7, wherein the client node initiates the first D2D communications session with the individual second client node upon successful receipt of the D2D session test acknowledgement message.

9. The client node of claim 7, wherein the client node does not initiate the first D2D communications session with the individual second client node if the D2D session test acknowledgement message is not successfully received.

10. The client node of claim 7, wherein the client node initiates a second D2D communications session with the individual second client node subsequent to the successful receipt of the D2D session test acknowledgement message.

11. A method for using a client node to initiate a device-to-device (D2D) communications session, comprising:
using a database comprising identification data and location data associated with at least one second client node; and
using processing logic to process the identification data and the location data to identify an individual second client node of the at least one second client node within D2D communication range;
wherein the processing logic is further operable to initiate an update of the identification data and the location data of the at least one second client node to maintain currency of location data,
wherein the client node receives a location data update message from the individual second client node, wherein the location data update message comprises updates to the location data associated with the individual second client node,
wherein, the processing logic is further used to initiate a first D2D communications session with the individual second client node that is within D2D communication range, wherein the client node receives the location data update message from the individual second client node in response to a perceived location change of the individual second client node.

12. The method of claim 11, wherein the client node receives the location data update message from the individual second client node, further comprising, in response to a predetermined time elapsing after the first D2D communications session is established between the client node and the individual second client node.

13. The method of claim 11, wherein the client node receives the location data update message from the individual second client node, further comprising, in response to the distance between the client node and the individual second client node exceeding a predetermined threshold.

14. The method of claim 13, wherein the client node receives the location data update message from the individual second client node after a predetermined interval after the client node establishes a communications session with the individual second client node.

15. The method of claim 14, wherein the frequency of the predetermined interval of the receipt of location data update message is dependent upon the distance between the first and second client nodes.

16. The method of claim 11, wherein the D2D communications session comprises one of the set of:

data communications directly between client nodes;
Multiple Input Multiple Output (MIMO) configurations;
Cooperative Multipoint (CoMP) configurations;
Interference Control (IC); and
relaying of information among client nodes.

17. The method of claim 11, wherein:
the client node generates and subsequently sends a first D2D session test message to the individual second client node;
the individual second client node successfully receives the first D2D session test message; and
the individual second client node generates and subsequently sends a D2D session test acknowledgement message to the client node.

18. The method of claim 17, wherein the client node initiates the first D2D communications session with the individual second client node upon successful receipt of the D2D session test acknowledgement message.

19. The method of claim 17, wherein the client node does not initiate the first D2D communications session with the individual second client node if the D2D session test acknowledgement message is not successfully received.

20. The method of claim 17, wherein the client node initiates a second D2D communications session with the individual second client node subsequent to the successful receipt of the D2D session test acknowledgement message.

21. A non-transitory computer readable medium storing computer readable instructions executable by a processor to implement a method for using a client node to initiate a device-to-device (D2D) communications session, the method comprising:
using a database comprising identification data and location data associated with at least one second client node; and
using processing logic to process the identification data and the location data to identify an individual second client node of the at least one second client node within D2D communication range;
wherein the processing logic is further operable to initiate an update of the identification data and the location data of the at least one second client node to maintain currency of location data,
wherein the client node receives a location data update message from the individual second client node, wherein the location data update message comprises updates to the location data associated with the individual second client node,
wherein, the processing logic is further used to initiate a first D2D communications session with the individual second client node that is within D2D communication range, wherein the client node receives the location data update message from the individual second client node in response to a perceived location change of the individual second client node.

* * * * *